Figure 1:
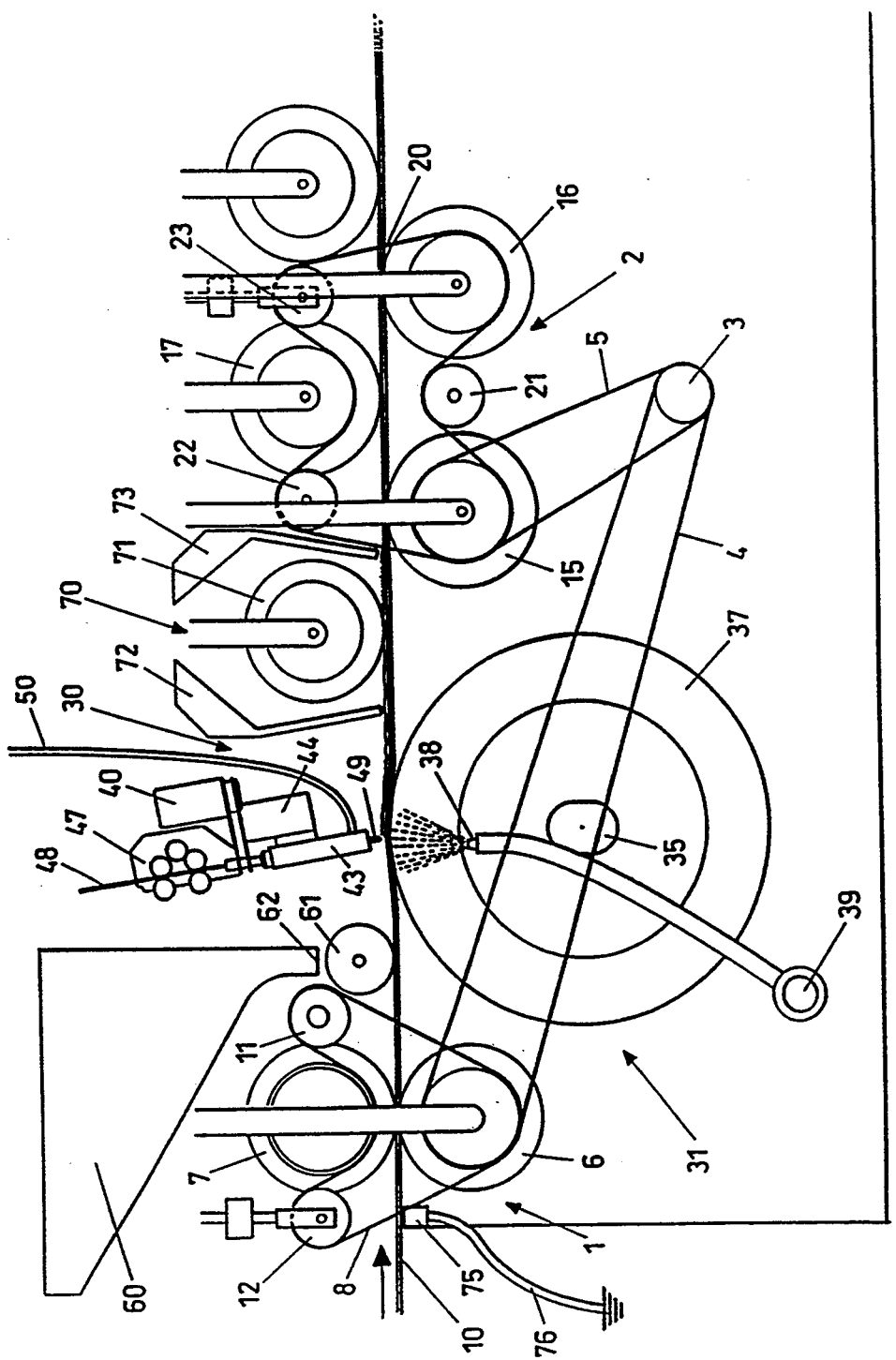

United States Patent [19]

Browne et al.

[11] Patent Number: 5,362,937
[45] Date of Patent: Nov. 8, 1994

[54] OVERLAYING OF PLATES

[76] Inventors: George W. Browne, 14 Bailey Road, Glen Forrest, Western Australia, Australia, 6071; Gene Kostecki, 40 Bramwell Road, Noranda, Western Australia, Australia, 6062

[21] Appl. No.: 137,115
[22] PCT Filed: Apr. 15, 1992
[86] PCT No.: PCT/AU92/00167
 § 371 Date: Oct. 18, 1993
 § 102(e) Date: Oct. 18, 1993
[87] PCT Pub. No.: WO92/18283
 PCT Pub. Date: Oct. 29, 1992

[30] Foreign Application Priority Data

Apr. 18, 1992 [AU] Australia .................. PK5700

[51] Int. Cl.5 .................................. B23K 9/04
[52] U.S. Cl. .................. 219/76.14; 219/125.12; 228/173.7
[58] Field of Search ............ 219/76.12, 76.14, 137 R, 219/125.12; 228/173.6, 173.7

[56] References Cited

U.S. PATENT DOCUMENTS

| | | | |
|---|---|---|---|
| 2,726,617 | 12/1955 | Knapp | 113/59 |
| 2,813,190 | 11/1957 | Felmley, Jr. | 219/76.14 |
| 3,185,814 | 5/1965 | Rossner et al. | 219/76 |
| 3,573,420 | 4/1971 | Johnson | 219/76 |
| 3,611,541 | 10/1971 | Garrett | 219/76.14 |
| 4,237,362 | 12/1980 | Arnoldy | 219/76.14 |
| 4,521,664 | 6/1985 | Miller | 219/76.14 |
| 4,805,826 | 2/1989 | Moriki et al. | 219/76.12 |

FOREIGN PATENT DOCUMENTS

| | | | |
|---|---|---|---|
| 107343 | 5/1984 | European Pat. Off. | |
| 0145196 | 10/1984 | European Pat. Off. | |
| 2548569 | 7/1983 | France | |
| 2131142 | 2/1972 | Germany | |
| 2135149 | 2/1973 | Germany | 219/76.14 |
| 273020 | 11/1989 | Germany | |
| 2190319 | 11/1987 | United Kingdom | |

*Primary Examiner*—Clifford C. Shaw
*Attorney, Agent, or Firm*—Armstrong, Teasdale, Schlafly & Davis

[57] ABSTRACT

An apparatus for applying weld metal for the purpose of hard-facing of metal plates and a method of operation of the apparatus. A metal plate is moved through an apparatus in which there are weld heads including welding electrodes. The metal plate has a slight induced convexity in the region of the welding heads so that an accurate distance is maintained between the welding electrode and the surface of the metal plate. The convexity is formed by a wheel assembly under the plates and the wheel assembly may also include cooling means. The advantage of the flat plate system is that long lengths of plate may be hard-faced.

16 Claims, 3 Drawing Sheets

OVERLAYING OF PLATES

This invention relates to the overlaying of weld metal onto metal plates and in particular it relates to plates of the type in which the material such as mild steel used in the production of various apparatus is faced with a layer of weld metal deposited by welding means to provide a hard facing or alloy cladding.

Overlaying of weld metal is already well known in the art and is used for instance in supplying tips to tools such as shears and the like used in agriculture and it is also known to overlay plates by welding. Overlaying may also be used to face metal with another metal or alloy.

One method of overlaying plates is to form a plate into a cylinder and then to fit this cylinder into a machine so as to rotate the cylinder beneath an array of welding heads positioned to deposit a layer of welding material onto the plates progressively as it is rotated until the entire surface of the plates in its cylindrical form is covered, after which the plate is cut and straightened to produce the hard faced sheet of material. A problem in such an arrangement is first that considerable work is entailed in forming the plates into a cylindrical form and then to straighten the plates into the form in which they will be used during manufacture of products. Certain difficulties also exist in control of the welding because of cylindrical form of the plate at the time that the welding material was applied by the heads. It is also a practical restriction on the size of a plate which can be welded by such a method.

Another problem exists with weld overlaying is that in the sheet material some portions of the sheet are heated more than others because two welding heads pass over the same area and this gives an uneven thickness of weld metal overlay and perhaps some change to the metallurgical structure of the underlying metal.

It is an object of the present invention to provide an improved method of manufacture and in order to carry out that method not subject to the difficulties encountered heretofore and this is achieved according to this invention by applying weld metal to form an overlay on the plate while the plate is in planar form and hence without any need for the step of cylindrical formation and subsequent flattening to planar form.

A further problem exists that when applying weld metal to a planar plate then some buckling can occur because of differences in temperature along the plate and hence this present invention includes means to prevent problems with distortion. Distortion causes a difference in distance between the metal and the welding head which causes arc instability and may cause irregularities in weld metal deposition.

This present invention provides solutions to the above problems or at least provides an alternative construction of machine.

In one form therefore the invention is said to reside in a weld overlaying apparatus comprising drive means to draw a metal plate substantially horizontally through the apparatus, and a plurality of welding heads arranged on a common oscillating carrier to oscillate for oscillating movement transverse to the direction of travel of the metal plate, characterized by an assembly positioned so as to be under the metal plate in use, wherein the assembly includes a slight upward convexity in the metal plate under the welding heads so as to accurately position the metal plate with respect to the welding heads.

It will be seen that by providing the slight upward convexity the metal plate is held in tension so that buckling will be minimized and hence the difference in distance between the surface of the metal plate and welding electrodes will vary as little as possible and hence a more even arc and a better lay down of weld metal will occur.

Preferably the assembly is a wheel assembly, and more preferably the wheel assembly is positioned under the welding head.

In one form of the invention the wheel assembly may include water cooling means whereby to cool the underside of the metal plate at the point of welding.

By cooling the metal plate at the point of welding minimum heat input into structure of the metal plate will occur and hence minimum distortion will occur.

In a preferred embodiment the wheel assembly may include a plurality of discs spaced apart on a central axis and the water cooling means may comprise water spray heads between the discs and adapted to direct a spray of water towards the region the weld heads to strike the underside of the metal plate when in use and hence cool the plate.

The weld overlaying apparatus according to this invention may further include flux and metal alloy powder addition means to apply a layer of flux and metal powder onto the surface of the metal sheet upstream of the weld head so that the flux and metal alloy powder can take part in the weld application process.

The type of flux and metal alloy powder used will depend upon the required hardness and/or metallurgical composition of the weld metal overlay.

There may be further included a slag breaking wheel downstream from the welding heads, the slag breaking wheel including a plurality of discs on a transverse axis and also including suction means to remove cracked slag.

The drive means may include drive rollers positioned above and below the line of travel of the metal plate and adapted to bear onto both upper and lower surfaces of the metal plate to securely hold the metal plate and move it forward as required. There may be drive means both upstream and downstream from the weld head and these can be driven so that the metal plate is kept in tension in the region where it passes over the wheel assembly and underneath the weld heads.

The drive means may be adapted to move intermittently the metal plate at the same time as the oscillation of the weld head reverses direction in its transverse travel. By this means the metal plate will be stationary while the plurality of weld heads transverse the plate but the plate moves forward when the weld heads reverse direction.

Each of the weld heads may include a continuously fed wire electrode and the weld head may include means to drive the wire electrodes as they are consumed in the welding process.

In a preferred embodiment of the weld overlaying apparatus according to this invention adjacent weld heads may be transversely offset from each other with respect to the direction of travel of the oscillating carrier. By such a transverse offset in the weld heads there will be limited localized heating caused by adjacent weld heads passing over or near the same point on the metal please when each weld head reverses direction. In one preferred embodiment the adjacent weld heads may be offset by a distance which is equivalent to half the distance that the plate is intermittently moved forward during operation of the welding apparatus.

In an alternative form the invention is said to reside in a method of overlaying weld metal onto a surface of a longitudinally moving metal plate for the purpose of hard facing or alloy cladding of the metal plate comprising the steps of laying down a layer of weld metal onto the metal surface by means of transversely reciprocating a set of weld heads across the longitudinally moving metal surface characterized by imparting a slight convexity to the metal plate as it passes under the weld heads by means of a wheel assembly under the metal plate whereby to accurately position the metal plate with respect to the weld heads.

A method according to this invention may further include the steps of laying down a layer of flux and metal alloy powder onto the surface of the metal plate before the plate passes under the weld heads.

The longitudinally moving of the metal plate may be incrementally moved forward at the same time that the oscillatory movement of the weld head reverses direction.

The method of this invention may further include the step of cooling the metal plate from underneath the plate in the region of the weld heads by means of water spray jets associated with the wheel assembly.

It will be seen that by this invention there is provided an apparatus to lay a surface of weld metal onto a metal plate and because the metal plate is moved horizontally there is no restriction on the length of the metal plate.

This then generally describes the invention but to assist with understanding the invention reference will now be made to the accompanying drawings which show a preferred embodiment of the invention.

Figure 2:
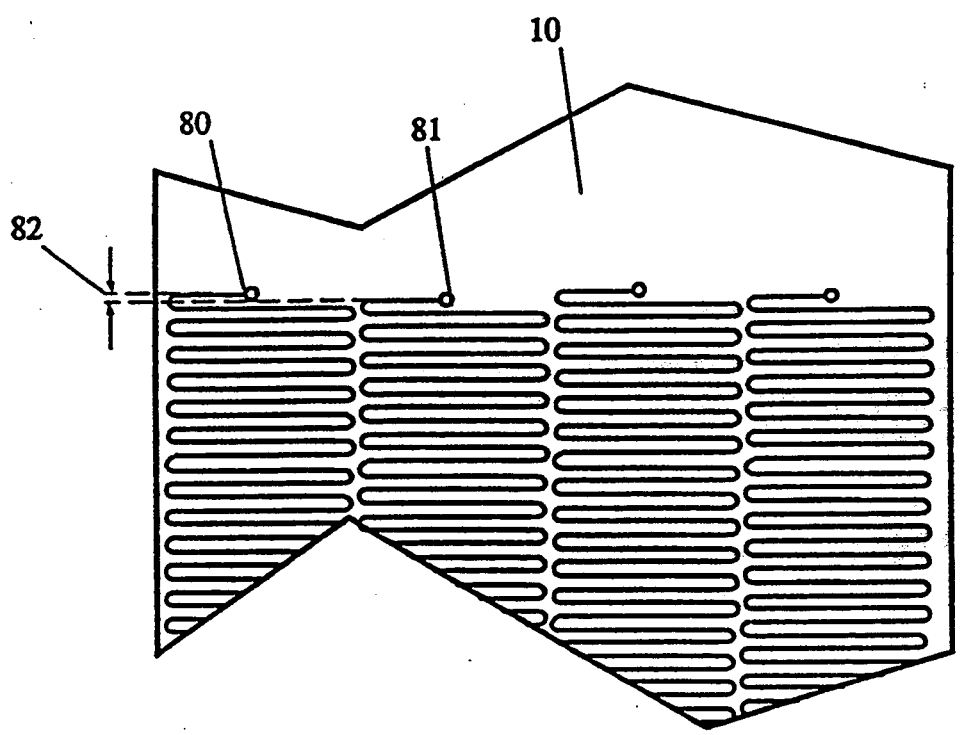
Figure 3:
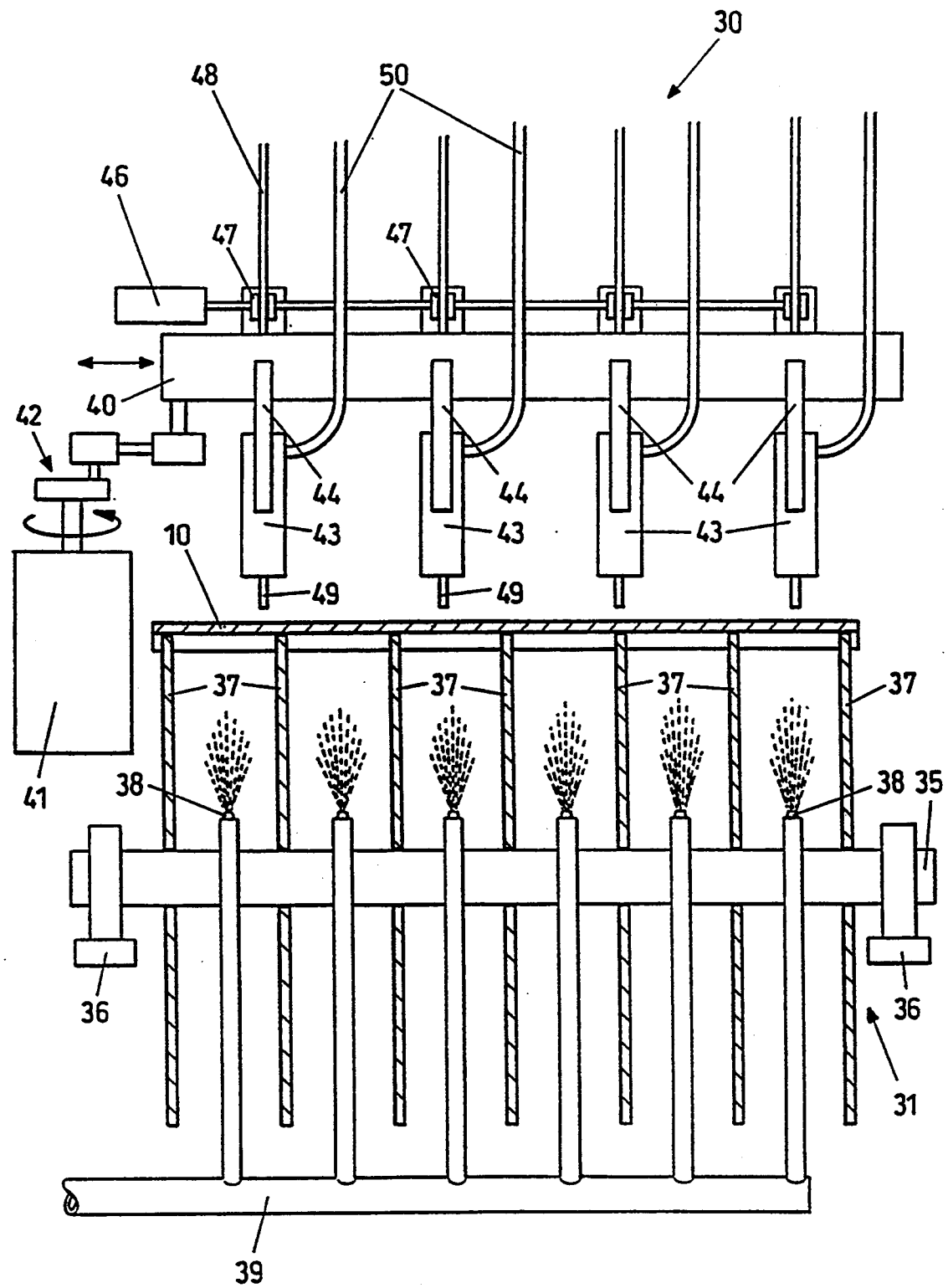

In the drawings:

FIG. 1 shows a side view in essentially schematic manner of a weld metal overlaying apparatus according to the present invention, FIG. 2 shows in schematic manner the arrangement of the oscillatory paths of the weld heads according to a preferred embodiment of the invention, and FIG. 3 shows a cross sectional view of the apparatus shown in FIG. 1 in the region of the weld heads again in schematic manner to show the arrangement of the wheel assembly and the weld heads.

Now looking more closely at the drawings it will be seen that the weld overlaying apparatus of the present invention comprises upstream drive means 1 and downstream drive means 2 driven from a common drive shaft 3 by means of chains 4 and 5. Upstream drive means 1 comprises lower drive wheel 6 and upper drive wheel 7 driven by a drive chain 8 with the metal plate 10 positioned between the upper and lower drive wheels 7 and 6. Idler wheel 11 and tensioning idler wheel 12 are provided to ensure that the chain 8 drives both wheels in their required direction.

The downstream drive assembly 2 comprises two lower drive wheels 15 and 16 and a single upper drive wheel 17. Drive chain 20 passes over the drive wheel 15, 16 and 17 and over idler wheels 21 and 22 and tensioning idler wheel 23 again to keep the chain in tension and ensure that all the drive wheels are driven in the same direction. Again the metal plate 10 passes over the lower drive wheels 15 and 16 and under the drive wheel 17.

The metal plate passes under a weld head assembly 30 and over a wheel assembly 31 between the upstream drive assembly 1 and the downstream drive assembly 2.

Other methods of driving the drive means may be provided such as shaft, gear or hydraulic drives.

With drive means both upstream and downstream from the welding station the metal plate can be kept in tension which will hold to reduce distortion during welding.

The wheel assembly 30 which can be seen more easily in FIG. 3 comprises a central axis 35 supported on bearings 36 and a number of annular discs 37 supported on the shaft 35. The discs 37 bear on the underside of the metal plate 10 and induce a slight convexity into the metal plate. A water spray assembly 38 supplied from a water manifold 39 sprays water between adjacent discs 37 to cool the underside of the metal plate 10.

Other embodiments of wheel assembly may be used to provide the slight convexity. One embodiment may be a plurality of small wheels arranged in an arc to bear up under the steel plate.

The weld head assembly 30 comprises a reciprocating carrier 40 supported by means (not shown) which are caused to reciprocate transversely to the direction of travel of the metal plate by means of a motor 41 and crank assembly 42. In this embodiment four weld heads 43 are supported by bracket means 44 from the carrier 40.

Other numbers of weld heads depending upon the width of the plate to be overlayed and drive means such as a linear motor may be used.

The welding heads in this embodiment are of the continuously wire fed type and wire feed motor 46 drives wire feed drives 47 which feed wire 48 through the weld heads so that respective welding tips 49 are a desired distance from the surface of the metal plate 10. Electricity is supplied to the weld head by means of cables 50.

The negative or ground electrode for the welding arrangement 75 may be positioned on the apparatus to bear underneath the metal plate 10 to be in contact with the metal plate to ensure good electrical conductivity and the earth by means of cable 76.

Just upstream from the welding heads is the flux and metal alloy powder applying means. This includes a hopper 60 which has a discharge end 62 which is spaced apart from a flux and metal alloy powder applying roller 51 so that a small amount of flux and metal powder exits through the hopper end 62 and is positioned on the roller 61 and as the roller 61 is driven (by means not shown) the powder is deposited onto the metal plate 10.

Immediately downstream from the weld heads 70 is the welding slag removing station 70.

The welding slag removal station 70 includes a slag cracking wheel 71 which comprises a plurality of annular discs fitted onto a central boss and which are run onto the weld surface of the metal arc of welding which cause any slag on to the surface to crack. The cracks slag is drawn by means of vacuum suction arrangement 72 before the slag cracking wheel and 73 after the slag cracking wheel.

As can be seen with particular reference to FIG. 2 the path of travel of the weld heads over the surface of the metal plate 10 is a series of oscillatory or side to side movements.

Adjacent weld heads 80 and 81 are spaced apart in the direction of travel of the metal plate by distance 82 which is approximately half the spacing between adjacent oscillations of the weld heads. It will be seen that by this offset spacing the paths of adjacent welding heads do not cross and hence localized points of overheating will not occur.

The method of operation of the weld metal overlaying apparatus according to this invention is as follows. A metal plate 10 is fed into the apparatus and the drive means 1 and 2 are driven in such a manner so as to keep the metal plate in tension where it passes over the wheel assembly 41. The metal plate also has a slightly induced convexity between the flux and metal powder adding roller 61 and the slag braking roller 71. The convexity is carried by the wheel assembly 30 which bears on the under side of the metal plate between the rollers 61 and 71. This slight convexity ensures that a fixed distance is maintained between the upper surface of the metal plate 10 and the tip of the welding electrode 49 whereby ensuring a constant arc size and hence constant depth of weld and consumption of the wire electrode 48.

It will be realized that with a crank assembly 42 driving the carrier 40 in oscillating action the speed of the oscillating carrier will not be constant across the entire width of travel as the change from rotatory motion of the crank to oscillatory motion of the carrier will cause slowing down at the ends of the travel. Hence there may be provided electronic control means (not shown) which detect the point at which slowing down becomes significant and which speeds up the motor 41 at the end of each movement in each direction of the carrier so that it very quickly transfers to the other direction of travel whereby preventing localized heating in the metal plate at the point of change of direction of the oscillating heads.

There may be provided computer control of the various parameters such as electrode feed rate, oscillation frequency, plate speed, powder thickness and cooling rate, so that variation in one of the parameters can be allowed for in the other parameters.

What is claimed is:

1. A weld overlaying apparatus comprising drive means to draw a metal plate substantially horizontally through the apparatus, and a plurality of welding heads arranged on a common oscillating carrier to oscillate for oscillating movement transverse to the direction of travel of the metal plate, characterized by an assembly positioned under the welding heads so as to be under the metal plate in use, wherein the assembly induces a slight upward convexity in the metal plate under the welding heads so as to accurately position the metal plate with respect to the welding heads.

2. A weld overlaying apparatus as in claim 1 wherein the assembly includes water cooling means whereby to cool the underside of the metal plate at the point of welding.

3. A weld overlaying apparatus as in claim 2 wherein the assembly includes a plurality of discs spaced apart from each other on a central axis and the periphery of these bearing onto the metal plate in use and the water cooling means comprising water spray heads between the discs and adapted to spray water towards the weld heads.

4. A weld overlaying apparatus as in claim 1 further including flux and metal alloy powder addition means to apply a layer of flux and metal powder onto the surface of the metal plate to which the weld overlay is to be applied.

5. A weld overlaying apparatus as in claim 1 further including a slag breaking wheel downstream from the welding heads, the slag breaking wheel including a plurality of discs on a transverse axis and also including suction means to remove cracked slag.

6. A weld overlaying apparatus as in claim 1 wherein the drive means comprises drive rollers positioned above and below the line of travel of the metal plate and adapted to bear onto the metal plate.

7. A weld overlaying apparatus as in claim 6 including drive means both upstream and downstream from the weld heads whereby to hold the metal plate between the upstream and downstream drive means in tension.

8. A weld overlaying apparatus as in claim 1 wherein the drive means is adapted to move intermittently the metal plate at the same time as the oscillation of the weld heads reverses direction.

9. A weld overlaying apparatus as in claim 1 wherein each of the weld heads includes a continuously fed wire electrode and the weld heads include means to drive the wire electrodes.

10. A weld overlaying apparatus as in claim 1 wherein adjacent weld heads are transversely offset from each other with respect to direction of travel of the oscillating carrier.

11. A weld overlaying apparatus as in claim 1 wherein the assembly is a wheel assembly.

12. A method of overlaying weld metal onto the surface of a longitudinally moving metal plate for the purpose of hard facing or alloy cladding of the metal plate comprising the steps of laying down a layer of weld metal onto the metal surface by means of transversely reciprocating a set of weld heads across the longitudinally moving metal surface, characterized by imparting a slight convexity to a metal plate as it passes under the weld heads by means of an assembly underneath the metal plate whereby to accurately position the metal plate in respect to the weld heads.

13. A method as in claim 12 further including the step of cooling the metal plate from underneath the plate in the region of the weld heads by means of water spray jets associated with the assembly.

14. A method as in claim 12 further including the steps of laying down a layer of flux and metal alloy powder onto the surface of the metal plate before the plate passes under the weld heads.

15. A method as in claim 12 further including the step of longitudinally moving the metal plate incrementally forward at the time the oscillatory movement of the weld heads reverses direction.

16. A method as in claim 12 wherein the assembly is a wheel assembly.

* * * * *